Aug. 25, 1936.  A. HERSHBERGER  2,051,944
MOISTUREPROOFING COMPOSITION AND METHOD OF MAKING SAME
Filed July 20, 1933
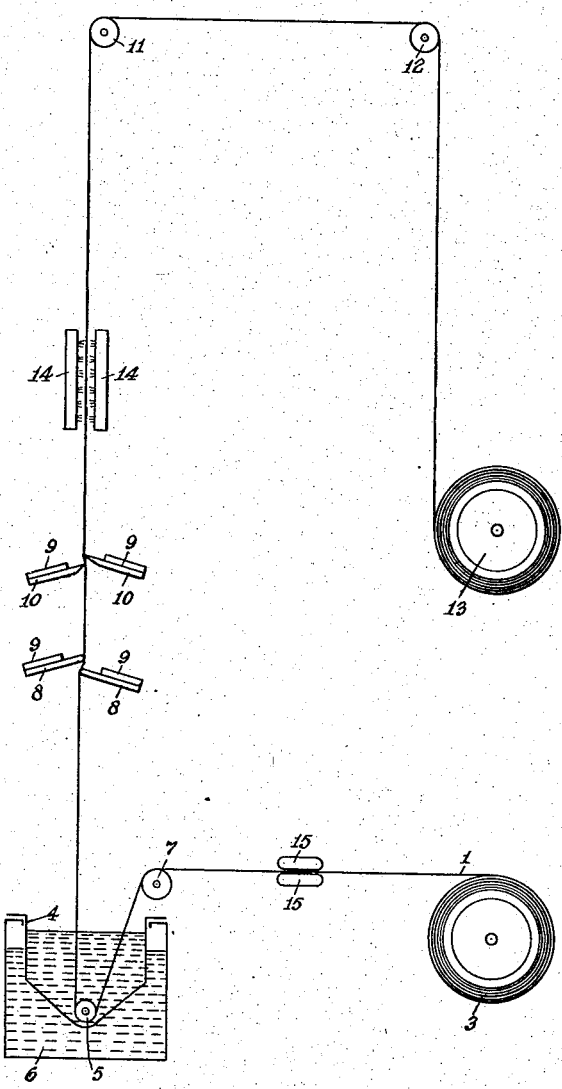

Patented Aug. 25, 1936

2,051,944

UNITED STATES PATENT OFFICE 2,051,944

MOISTUREPROOFING COMPOSITION AND METHOD OF MAKING SAME

Albert Hershberger, Kenmore, N. Y., assignor, by mesne assignments, to E. I. du Pont de Nemours & Company, Wilmington, Del., a corporation of Delaware Application July 20, 1933, Serial No. 681,294

4 Claims. (Cl. 134—17)

This invention relates to the manufacture of a glassclear, moistureproof material which is intended primarily for use as a wrapping tissue, though it is capable of other divers uses, such as windows in window envelopes or boxes, in the production of laminated materials, etc. More particularly, the instant invention relates to the composition of matter which is employed as the moistureproofing coating composition and to the method of making the same.

The nature and objects of the invention will become apparent from the appended claims, following description and accompanying drawing forming a part of this specification and wherein:

Figure 1 is a cross-section of a product having a coating thereon formed of a composition constituting the instant invention, and Figure 2 is a diagrammatic side elevation partly in section of an illustrative apparatus which may be employed in the manufacture of coated material.

The coating composition contemplated by the instant invention comprises a melt which, in its simplest form, is a wax composition containing rubber or an analogous substance, the rubber being present in an amount generally less than 10%, and preferably, when pure rubber is used, approximately 4%–7%, of the total solids. If desired, blending agents, that is, transparentizing, clearing or homogenizing agents, also may be incorporated in the composition. Likewise, modifying agents serving to impart certain desirable characteristics to the coating, such as color, hardness, improving the slip thereof, rendering it more favorable to heat-sealing operations, etc., may also be incorporated in the composition.

As the moistureproofing ingredient, any wax or wax-like or waxy substance capable of moistureproofing may be used. The paraffins, and preferably the high melting point paraffins, such as those melting over 50° C., such as 55° C. and preferably approximately 60° C. or over, are preferred, since they produce coatings which are characterized by very effective moistureproof qualities, improved slip and freedom from smear when compared to the lower melting point paraffins. Some of these high melting paraffins are commercial products. When, however, the still higher melting point paraffins are desired, they may be obtained, for example, from commercial paraffins by suitable treatment. For instance, the low melting fractions of commercial paraffins may be "sweated out" or fractionated out by means of solvents, or they may be removed by distillation so as to yield a relatively high melting, hard, white, crystalline type of paraffin. Though the hard and high melting point paraffins are definitely preferred, ceresins and some of the hard synthetic or manufactured waxes, for instance various derivatives of the Montan waxes or Montanic acid, may be used as alternatives. The moistureproofing waxes may be used singly or in combination, as may be desired.

As the rubber constituent, pure gum or unvulcanized rubber, such as crepe rubber, is preferred. However, gutta percha, balata, caoutchous, synthetic rubber-like materials, chemical derivatives of rubber, such as thermoprene, hydrogenated thermoprene and other derivatives of thermoprene, hydrogenated rubber, halogenated rubber such as chlorinated rubber and other rubber-like substances, such as the polymers of isoprene, butadiene and their homologues, may be used. These rubber or rubber-like sustances may be used singly or in combination with one another, as desired.

The term "rubber-like" employed in this specification is intended to cover rubber, chemical derivatives of rubber, derivatives obtained from rubber by physical or chemical treatment and analogous substances, such as those enumerated above.

The rubber or equivalent substance in the composition imparts certain desirable characteristics to the product. It improves the heat-sealing effect of the product and also the flexibility of the coating. It furthermore, tends to improve the adhesion between the coating and the base, and also tends, to a degree, at times, to prevent the crystallization of the waxes. Compositions containing rubber yield a melt of increased viscosity, which viscosity can be regulated by the amount of rubber used or its degree of degradation. Thus, the melt possesses what might be considered a body which assists in the coating operation in laying down a somewhat thicker and more even coat than would a thin melted body.

In producing compositions of the type to which this invention relates, clarity and brilliance in coating, and particularly in the thicker layers, may be improved by incorporating blending agents in the composition. As illustrative blending agents may be mentioned resins, both natural and synthetic, hydrogenated castor oil, hydrogenated cocoanut oil, hydrogenated cotton-seed oil, stearic acid, anhydrous wool grease, "Paraflow," etc., or such materials as diphenyl or B-naphthol when a slight odor is not objectionable.

The resins are characterized by complete solubility in hydrocarbons. Resins, such as ester gum rosin, hydrogenated ester gum, vinyl types of resin which have been so modified as to cause them to be soluble or capable of being dispersed in melted wax, the oil-soluble glyptals, more especially the harder variety, and the chlorinated diphenyl resins, are several illustrative examples of other resins which may be used.

The blending agents are generally used in minor quantities. They may constitute as much as 20%, although between 5% and 15% of the composition is the preferred range. In some cases where the blending agent is oily or a low melting grease, the quantity should be less than 5% of the composition in order to avoid sticky surfaces. The blending agents also improve the gloss and brilliancy of the coating.

The resins, in addition to functioning as blending agents, may also serve to impart additional desired properties to the coating. For example, resins of the film-forming type, such as those of the vinyl type above mentioned, improve the water-resistance of the coating. Again, resins of the film-forming type and/or thermoplastic type, such as the vinyl resins above mentioned, improve the heat-sealing properties of the product.

To achieve other properties in the coatings, a variety of materials or modifying agents which are compatible with the melts may be used. For example, dyes or pigments may be employed to secure color effects or translucency as would be furnished by certain types of pigments. To improve the surface slip of the coating, small quantities of metallic soaps, such as, for example, less than 10% of zinc or aluminum stearate, may be incorporated in the melt. Small quantities, such as 2% to 10% of the composition, of thermoplastic cellulose derivatives, of which ethyl cellulose, benzyl cellulose, cellulose butyrate, cellulose esters of long chain fatty acids, such as cellulose stearate, cellulose laurate, etc., are examples, may also be employed to increase the heat-sealing effect of the coating. For instance, when a cellulose ether of high ethylation, and preferably containing over two ethyl groups, is employed in an amount equal to the rubber constituent, the coating will possess improved heat-sealing properties over the same formula in the absence of ethyl cellulose.

In cases where an increased hardness in the coating is desired, this may be secured by incorporating a wax hardening agent, such as a hard wax, for example, candelilla wax, carnauba wax, the Montan waxes or synthetic derivatives of Montan waxes, bayberry wax, Brazil wax, glycowax B-430, etc., either alone or in combination with each other. The quantity of the wax hardening agent may vary from 10% to 60% of the composition.

Optionally, small quantities of softening agents, such as mineral oils, high boiling, odorless, organic liquids, or low melting solids may be used. If desired, materials, such as triethanolamine or triethanolamine soaps, which tend to lower the surface tension between the melt and the base to be coated may be employed.

If desired, vulcanizing agents or anti-oxidants may also be incorporated in the mass. Also, when the quantity of rubber in the composition is such as to impart a tacky surface, this may be overcome by treating the coated material with sulphur chloride, bromide vapor, chlorine gas, ozone, or other chemical agents. After treatment of the finished film with sulphur chloride, etc., the thus-treated film is submitted to a process which will remove or destroy the last traces of these vapors.

The compositions may comprise a melt consisting of the ingredients above mentioned or a quasi melt or pseudo melt, that is, the above ingredients together with minor quantities of hydrocarbons or chlorinated hydrocarbons or appropriate solvents. The solvent in such composition is present usually in an amount not exceeding the total quantity of the solid film-forming ingredients and generally to the extent of 25% to 50% of the total mass, solids and solvents. The use of these solvents does not destroy the character of the mass as a melt. They are used for the purpose of improving the appearance of the final coated sheet and obviating some of the difficulties encountered at times during coating with streaks in the finished product.

Melts containing rubber may be prepared by various procedures. To prepare a melt containing rubber and secure optimum results, the paraffin is milled into the rubber, which may be in sheet form, by calender rolls, preferably made of steel. At the beginning of the operation, the calender rolls are hot and the paraffin is gradually milled into the rubber. As the operation proceeds, the temperature of the rolls is gradually lowered so that by the time approximately equal quantities of the paraffin and rubber have been milled together, the rolls are at room temperature. The rubber and wax mass is then removed from the rolls and blended with the other ingredients of the selected formula, as hereafter described.

The remainder of the paraffin as well as the other ingredients of the final formula, in their proper proportions, are introduced into a water-jacketed shredder or macerator and heated to a temperature just below the melting point while the knives are in motion. This forms a pasty or semi-pasty mass. To this mass, while it is being agitated by the knives, the proper amount of the rubber-paraffin mass prepared on the calendar rolls is added, either gradually in stages or all at one time. Macerating by the knives is continued at a temperature just sufficient to keep the mass in a pasty condition until complete homogenization of the rubber with the other ingredients takes place, the criterion for which is the absence of lumps when any portion of the mass is taken out and raised to a temperature clearly above its melting point. This operation usually takes several hours. Finally, when the mass has become lump free, it is removed, melted, filtered, and is then ready for use in the coating machine.

In order to more clearly explain the nature of the compositions contemplated by the instant invention, there will hereafter be set forth several specific illustrative examples. It is to be understood that these examples illustrate several embodiments which have given satisfactory results and are not intended to restrict the invention thereto.

*Example I*

| | Parts |
|---|---|
| White paraffin (melting point 60–61° C.) | 47 |
| Refined carnauba wax | 47 |
| Gum rubber | 6 |

*Example II*

| | Parts |
|---|---|
| Paraffin (melting point 64° C.) | 85 |
| Refined carnauba wax | 10 |
| Rubber | 5 |

Example III

| | Parts |
|---|---|
| Paraffin (melting point 64° C.) | 65 |
| Candelilla wax | 30 |
| Rubber | 5 |

Example IV

| | Parts |
|---|---|
| Paraffin (melting point 60–61° C.) | 75 |
| Gum dammar | 20 |
| Rubber | 5 |

Example V

| | Parts |
|---|---|
| Paraffin (melting point 60–61° C.) | 40 |
| Refined carnauba wax | 40 |
| Ester gum | 15 |
| Rubber | 5 |

Example VI

| | Parts |
|---|---|
| Paraffin (melting point 64° C.) | 60 |
| Refined carnauba wax | 20 |
| Gum dammar | 15 |
| Rubber | 5 |

Example VII

| | Parts |
|---|---|
| Paraffin (melting point 64° C.) | 55 |
| Candelilla wax | 25 |
| Hydrogenated castor oil | 16 |
| Rubber | 4 |

Example VIII

| | Parts |
|---|---|
| Paraffin (melting point 61–62° C.) | 50 |
| Candelilla wax | 35 |
| Diphenyl | 10 |
| Rubber | 5 |

Example IX

| | Parts |
|---|---|
| Paraffin (melting point 60–61° C.) | 45 |
| Refined carnauba wax | 45 |
| Rubber | 5 |
| High ethylated cellulose | 5 |

Example X

| | Parts |
|---|---|
| Paraffin (melting point 64° C.) | 60 |
| Candelilla wax | 30 |
| Rubber | 5 |
| Zinc stearate | 5 |

The selected composition preferably prepared as above described is applied in the molten state to the base to be coated. After application and before the composition has had time to set, the surplus thereof is removed in any suitable and convenient manner, and simultaneously with, or preferably subsequently to, the surplus-removing operation the composition is subjected to means which function to produce a smooth, glossy and transparent coating. Experimental evidence at the present time shows that in the operation, wherein the coating is smoothed, etc., the wax molecules tend to become oriented in such a manner that their carbon chains stand more or less perpendicular to the surface of the film. Subsequently, the coating is permitted to set by travel in the air or by projecting thereon a blast of any suitable chilling medium, such as air. After the coating has been set and where the base is of the type which loses moisture during the process, the coated material may be given a humidifying treating in a warm moist atmosphere to restore or increase the original flexibility of the base. Finally, the coated film is wound on a suitable wind-up device. It is to be noted that the coating, while in the molten state, does not engage with any mechanism other than the surplus-removing device and the smoothing or wax molecule orientation device until it is in a set condition.

It is to be noted that in the process described in the immediately preceding paragraph, the wax film or coating is laid down in a glass-clear transparent state. In so far as the prior art is concerned, when a wax coating or film was laid down, it was generally opaque and, at the very best, only translucent.

The product resulting from the aforementioned method is diagrammatically illustrated in Figure 1, wherein the reference numeral 1 designates the base provided with a thin, moistureproof, glass-clear coating 2 formed of the composition to which the instant invention relates.

Referring now to Figure 2 of the drawing, illustrating one embodiment of an apparatus which has given satisfactory results, the reference numeral 3 designates a supply roll of the base material 1 which is to be coated and from which it is fed into a tank 4 containing the molten wax-rubber composition and below a freely rotatable roller 5 mounted therein. The tank 4 is provided with any suitable heating mechanism whereby the wax-rubber mix may be melted or, if previously melted, maintained in a melted condition. In the embodiment shown in the drawing, the contents in the tank 4 is heated in any suitable manner, such as through the medium of an electrically heated oil bath 6. Prior to the immersion of the base 1 into the molten mass, it may be fed over one or more guide rollers 7. From the bath, the base 1 provided with the molten coating passes, preferably, in a vertical direction through heated doctor knives 8, 8 having rounded or blunt scraping edges and slightly overlapped so as to remove the excess wax composition. The knives 8, 8 are heated by means of, for example, electrical heating units 9, 9 and kept at a temperature at least equal to and preferably above the melting point of the wax. In addition to serving to remove the excess composition from the base, the knives 8, 8 also serve to smooth and impart a glossy surface to the coating.

If desired, a second set of knives 10, 10 may be employed in conjunction with the knives 8, 8. The knives 10, 10 are also heated by means of, for example, electrical heating elements 9, 9, and are provided with edges which have a shorter radius of curvature and therefore are sharper than those of the knives 8, 8 and which serve to smooth and impart a glossy surface to the coating without removing any coating from the base. When the two sets of knives are employed, the first set, i. e., 8, 8, merely serves as a surplus-removing element, and the second set, i. e., 10, 10, functions as described.

The knives 8, 8 and 10, 10 are preferably made of hard metal. They are highly polished and made as true as possible. In the apparatus illustrated, the knives are overlapped slightly so that the excess composition which is removed depends upon the friction of the sheet upon the knives.

The knives 10, 10 are disposed sufficiently close to the first set of knives 8, 8 so that there is no appreciable temperature drop on the coated sheet from the time it passes from the first to the second set of knives. In other words, the wax mixture on the sheet is still in the molten condition by the time it reaches the second set of electrically heated knives 10, 10. If desired, the knives 8, 8 and 10, 10 may be suitably encased. Obviously, a plurality of sets of knives 10, 10 may be used if desired.

Experimental evidence at this time shows that when the coating is smoothed, etc., either by the knives 8, 8 or knives 10, 10 under the conditions described, the wax molecules tend to become oriented in such a manner that their carbon chains stand more or less perpendicular to the surface of the film.

After leaving the knives 10, 10, the coated sheet progresses vertically upwards for a distance sufficient to permit the coating to solidify before it engages the guide or roll 11. This is important and critical since, if the coating were not solidified at the time it engaged the roll 11, it would be smeared or otherwise impaired. From the roll 11 the coated sheet passes to another guide roll 12 and is finally wound upon a suitable take-up device 13.

When the base 1 is of the type which loses moisture during the process, the coated material, prior to the winding-up of the coated film, may be subjected to a humidifying treatment in a warm, moist atmosphere. In order to ensure and accelerate the solidification of the coating prior to engaging the roll 11, the coated material may be positively cooled, such as by projecting a cooling medium through the nozzles 14 on to the coated film after it leaves the last doctor knives. A positive cooling is preferred, since this serves to improve the transparency and/or gloss of the final product.

Since the amount of wax mixture deposited on the sheet is regulated by the contact of the surplus-removing knife mechanism 8, 8, it is advantageous and desirable to regulate the tension on the sheet as it runs through the machine, so that it will be constant at all times. Otherwise, there will be different amounts of coating deposited on the film depending on the tension variations. The tension may be controlled and regulated by an appropriate means, such as for example, by a suitable braking mechanism (not shown) cooperating with the supply roll 13.

It is advantageous to use a roll of film which has been cut with a shear cut so that there will be no slivers or loose shreds of the material which will contaminate the coating bath and which later might be carried up, lodging underneath the knives and causing streaks. It is also advisable to pass the material to be coated through one or more dust and dirt removers or wipers 15 which will collect and remove any extraneous materials, including particles of dust or dirt, which might contaminate the bath. The melt should also be protected from falling dust, dirt and other foreign particles in any suitable manner.

When the method and apparatus described are employed, it frequently happens that small particles of foreign material or dirt lodge beneath the knife and between it and the sheet being coated, thus leaving intermittent streaks in the final product after it is cooled. If there were absolutely no foreign particles in the melt and it could be kept absolutely clean at all times, and if there were absolutely no flaws or defects in the knives, there would, of course, be obtained a uniform coating free from streaks or knife scratches. In a practical way, this extreme degree of cleanliness and perfection cannot always be achieved, particularly on a large commercial scale of operation where thousands of feet of film are being run through a bath continuously. It has been found that a considerable portion of these small streaks or scratches can be overcome by the use of a melt containing minor quantities of solvents, applying the melt by the method hereafter described with no further precautions than those already mentioned. These solvents being present in relatively small amounts evaporate from the film quite easily and readily after it leaves the last pair of doctor knives and before the film has been wound up. It may or may not be necessary to use special precautions to drive out these solvents depending on the solvents and/or the set of conditions under which the apparatus is operated. These solvents, of course, can be recovered, but usually the quantity is so small that no substantial cost is added to the process by their loss. The use, however, does have a positive effect in producing a film more clearly free from scratches and streaks than is secured without the use thereof.

By regulating the surplus-removing knives and the tension, the thickness of the coating deposited will be varied within wide limits. When the base is formed of a sheet or film of regenerated cellulose having a thickness of 0.0009 inch, satisfactory results are secured if the total thickness of the coating on both sides is between 0.00001 and 0.00015 inch depending on the formula of the composition and the process used. Highly satisfactory results are secured when the total thickness of the coating on both sides is 0.00003–0.00005 inch.

Though the invention has been described particularly in connection with sheets or films of regenerated cellulose, it is not restricted thereto. Other membraneous materials which are non-fibrous, non-porous, transparent and have smooth surfaces, such as sheets or films of cellulose derivatives, for example, sheets or films of cellulose nitrate, cellulose acetate, cellulose ethers, or sheets or films of albuminous materials, such as gelatin, agar-agar, casein sheets or films made of a rubber derivative, etc., may be used as the base.

The composition constituting one part of the instant invention produces coatings which are moistureproof, thin, flexible, free from foreign odors, tasteless, non-toxic, heat-sealable for certain purposes where a strong and rugged joint is not required and in the preferred embodiment also glass clear in transparency. They also possess a good gloss and are also characterized by a good surface slip, so that sheets coated therewith will slide easily one over the other. The coatings are also free from an objectionable degree of smearing. They are sufficiently hard so as to withstand objectionable marring or smearing, even when the sheets provided therewith are disposed in stacks or rolls under ordinary weather and temperature conditions. Obviously, the aforementioned properties and characteristics are imparted to the bases coated with the compositions. By virtue of the fact that the coatings are free from all foreign odors, materials provided with such coatings are entirely suitable for bake goods, which is probably the most critical trade on odors. Likewise, due to the fact that the coatings are tasteless and non-toxic to an extent sufficient to pass any bake goods standard, sheets provided therewith also pass this standard.

By the term "moistureproof" as employed in this specification is meant the ability of a sheet or film of regenerated cellulose of a thickness of 0.0009 inch and having a coating on both sides, the total thickness of both coatings not exceeding 0.00015 inch to resist the passage or penetration of moisture or water vapor therethrough to an extent at least 10 times, and preferably 15, 20, 30, 40, 50, 100 or indeed more times, as effective as a sheet or film of regenerated cellulose of the same thickness when tested in accordance with the test set forth in the Journal of Industrial and Engineering Chemistry on page 575, vol. 21, No. 6 (June 1929).

Since it is obvious that various changes and modifications may be made in the above description without departing from the nature or spirit thereof, this invention is not restricted thereto except as set forth in the appended claims.

I claim:

1. A composition-of-matter consisting of a moistureproofing agent; a film-forming substance in an amount less than 10% by weight of the ingredients remaining in the final product and selected from the class which consists of gum rubber, gutta percha, balata, synthetic rubber-like material, chemical derivatives of rubber including Thermoprene, hydrogenated Thermoprene and other derivatives of Thermoprene, hydrogenated rubber, halogenated rubber, rubber-like substances including polymers of isoprene, butadiene and their homologues; and one or more substances which modify the property of the product in an amount not exceeding 60% by weight of the ingredients remaining in the final product and selected from the class which consists of blending agents, substances which increase the heat-sealing effect of the product, substances which increase the hardness of the coating and softening agents; in such relative proportions that the composition will produce from a molten condition a glass-clear transparent, moistureproof, non-tacky coating or film in a thickness of 0.000005 and 0.000075 inch.

2. A composition-of-matter consisting of

| | Parts by weight |
|---|---|
| Paraffin (melting point 60–61° C.) | 47 |
| Refined carnauba wax | 47 |
| Gum rubber | 6 | said composition producing from a molten condition a glass-clear transparent, moistureproof, non-tacky coating or film in a thickness of 0.000005 and 0.000075 inch.

3. A composition-of-matter consisting of

| | Parts by weight |
|---|---|
| Paraffin (melting point 64° C.) | 60 |
| Refined carnauba wax | 20 |
| Gum dammar | 15 |
| Rubber | 5 | said composition producing from a molten condition a glass-clear transparent, moistureproof, non-tacky coating or film in a thickness of 0.000005 and 0.000075 inch.

4. A composition-of-matter consisting of

| | Parts by weight |
|---|---|
| Paraffin (melting point 64° C.) | 55 |
| Candelilla wax | 25 |
| Hydrogenated castor oil | 16 |
| Rubber | 4 | said composition producing from a molten condition a glass-clear transparent, moistureproof, non-tacky coating or film in a thickness of 0.000005 and 0.000075 inch.

ALBERT HERSHBERGER.